United States Patent
Bond et al.

(10) Patent No.: US 7,337,078 B2
(45) Date of Patent: Feb. 26, 2008

(54) SYSTEM AND METHOD FOR REMOTE ASSET MONITORING

(75) Inventors: Stuart K. Bond, Broken Arrow, OK (US); Joshua R. Fate, Tulsa, OK (US); Michael Gaut, Broken Arrow, OK (US); Travis J. Spencer, Tulsa, OK (US); Cornelis Zandbergen, Jr., Tulsa, OK (US)

(73) Assignee: WorldTelemetry, Inc., Tulsa, OK (US)

( * ) Notice: Subject to any disclaimer, the term of this patent is extended or adjusted under 35 U.S.C. 154(b) by 0 days.

(21) Appl. No.: 10/926,708

(22) Filed: Aug. 25, 2004

(65) Prior Publication Data
US 2005/0159905 A1 Jul. 21, 2005

Related U.S. Application Data

(60) Provisional application No. 60/537,379, filed on Jan. 16, 2004.

(51) Int. Cl.
*G01F 17/00* (2006.01)
*G08B 1/08* (2006.01)

(52) U.S. Cl. .................... 702/51; 340/539.22

(58) Field of Classification Search ............ 702/51, 702/188, 50, 52, 55; 455/92, 352; 340/539.22, 340/870.01, 870.38; 700/9, 19, 20; 73/313, 73/290 R, 304 C, 304 R
See application file for complete search history.

(56) References Cited

U.S. PATENT DOCUMENTS

| | | | |
|---|---|---|---|
| 4,427,132 A * | 1/1984 | Thomson | ............. 222/23 |
| 4,487,065 A | 12/1984 | Carlin et al. | |
| 4,551,719 A | 11/1985 | Carlin et al. | |
| 5,111,201 A * | 5/1992 | Matsumura et al. | ... 340/870.38 |
| 5,132,968 A | 7/1992 | Cephus | |
| 5,264,368 A | 11/1993 | Clarke et al. | ............. 436/3 |
| 5,265,032 A | 11/1993 | Patel | |
| 5,341,670 A | 8/1994 | Brook et al. | |
| 5,586,050 A * | 12/1996 | Makel et al. | ............. 702/51 |
| 5,609,059 A * | 3/1997 | McEwan | ............. 73/290 R |
| 5,708,424 A | 1/1998 | Orlando et al. | |
| 5,905,786 A | 5/1999 | Hoopes | |
| 6,058,171 A | 5/2000 | Hoopes | |

(Continued)

FOREIGN PATENT DOCUMENTS

EP   0 376 646 A2   7/1990

(Continued)

*Primary Examiner*—John Barlow
*Assistant Examiner*—Toan M. Le
(74) *Attorney, Agent, or Firm*—Fellers, Snider, Blankenship, Bailey & Tippens

(57) ABSTRACT

A system and method for remotely monitoring conditions at a location and for controlling devices at the location. The inventive system includes: a data link in communication with an electronically readable instrument, the data link having a transceiver configured for wireless digital communication; and a data gate having a wireless transceiver configured to communicate with one or more data links, the data gate also having an interface for connection to a communication network such as a land-line telephone network, cellular/pcs network, satellite communication network, or the like. In a preferred embodiment, the data gate communicates with a server via the communication network where the information from the electronically readable instrument is processed and made available to other devices over a computer network.

25 Claims, 5 Drawing Sheets

U.S. PATENT DOCUMENTS

| | | |
|---|---|---|
| 6,124,806 A | 9/2000 | Cunningham et al. |
| 6,125,697 A | 10/2000 | Holton et al. |
| 6,208,247 B1 | 3/2001 | Agre et al. ............... 340/539 |
| 6,262,659 B1 | 7/2001 | Korkosz et al. ........... 340/539 |
| 6,336,362 B1* | 1/2002 | Duenas .................... 73/313 |
| 6,348,744 B1 | 2/2002 | Levesque ................. 307/86 |
| 6,401,045 B1 | 6/2002 | Rogers et al. |
| 6,405,135 B1 | 6/2002 | Adriany et al. |
| 6,437,692 B1* | 8/2002 | Petite et al. ............... 340/540 |
| 6,512,463 B1 | 1/2003 | Campbell et al. |
| 6,529,067 B2 | 3/2003 | Uen et al. .................. 327/544 |
| 6,553,336 B1 | 4/2003 | Johnson et al. |
| 6,624,760 B1 | 9/2003 | Kinzel et al. |
| 6,717,529 B1 | 4/2004 | Belvin et al. ........... 340/870.16 |
| 6,720,887 B1 | 4/2004 | Zunti |
| 6,728,293 B1 | 4/2004 | Partyka .................... 375/131 |
| 6,748,278 B1* | 6/2004 | Maymudes ................ 700/17 |
| 6,917,288 B2* | 7/2005 | Kimmel et al. ........... 340/511 |
| 6,919,803 B2* | 7/2005 | Breed ...................... 340/539.14 |
| 6,934,644 B2* | 8/2005 | Rogers et al. ............. 702/55 |
| 7,002,481 B1* | 2/2006 | Crane et al. .............. 340/618 |
| 7,053,767 B2* | 5/2006 | Petite et al. ............. 340/539.22 |
| 2001/0040509 A1 | 11/2001 | Dungan |
| 2001/0045892 A1 | 11/2001 | Thomas et al. |
| 2002/0019725 A1 | 2/2002 | Petite |
| 2003/0025612 A1 | 2/2003 | Holmes et al. ........ 340/870.02 |
| 2003/0169717 A1* | 9/2003 | Reitmeier et al. ......... 370/338 |
| 2004/0004545 A1 | 1/2004 | Early |
| 2004/0004550 A1 | 1/2004 | Early |
| 2004/0004551 A1 | 1/2004 | Early |
| 2004/0075566 A1 | 4/2004 | Stepanik et al. |
| 2004/0078117 A1 | 4/2004 | Vandorah et al. |
| 2004/0113773 A1 | 6/2004 | Nieters et al. ........ 340/539.22 |
| 2004/0181693 A1* | 9/2004 | Milliot et al. ............. 713/201 |
| 2005/0083197 A1* | 4/2005 | Glenn et al. ........... 340/539.22 |
| 2005/0222933 A1* | 10/2005 | Wesby ..................... 705/36 |

FOREIGN PATENT DOCUMENTS

| | | |
|---|---|---|
| EP | 376646 A2 * | 7/1990 |
| EP | 1 045 228 A1 | 10/2000 |

* cited by examiner

SYSTEM AND METHOD FOR REMOTE ASSET MONITORING

RELATED APPLICATIONS

This application claims priority to U.S. Provisional Application No. 60/537,379 filed Jan. 16, 2004, entitled System and Method for Remote Asset Monitoring.

BACKGROUND OF THE INVENTION

1. Field of the Invention

The present invention relates to a system and method for the monitoring and management of data. More particularly, but not by way of limitation, the present invention relates to a system for remotely monitoring conditions at a storage tank, containment, dispenser sump, pipeline, or the like, in an intrinsically safe manner and for the management of data collected as a result of such monitoring.

2. Background of the Invention

Conditions such as the level of fluid in a storage tank, vapor/fluid flow through a pipeline, or electrical usage are often of concern. The need to remotely monitor such conditions has long been recognized. While electronically readable instrumentation may be readily available for such monitoring, there are few options presently available for remote monitoring of such instrumentation.

For example, many homes use LP gas as a primary source of energy, particularly for heat producing appliances such as heating systems, ovens and ranges, water heaters, etc. Typically, each residence is provided with its own storage tank to supply the energy needs of that house. Periodically, the home owner must check the gauge of the tank and order more LP gas when the tank is low. Alternatively, a supplier may enter into an agreement with a home owner to periodically check the tank level and refill the tank when warranted. Either way, the periodic checking of the gauge is at a minimum inconvenient, unreliable and possibly costly.

One known alternative has been to equip such tanks with an electronically readable gauge. In one such configuration, the gauge is connected to a battery operated, radio frequency transmitter, which periodically transmits the tank level to a receiver located at the house. The receiver collects usage information and at some interval, calls the gas supplier via a phone line to report the collected information. The receiver may also be configured to recognize abnormal conditions and spontaneously report events such as a minimum level, usage indicative of a leak, etc. While a vast improvement over manual monitoring, these systems still suffer from a number of limitations.

By way of example, limitations include: there is no means for communicating back to the tank for purposes of control, special monitoring, or programming changes; transmissions occur at a fixed rate regardless of the need to update or changing conditions, thereby wasting transmitter battery life; transmissions occur asynchronously and thus, in an area with multiple transmitters, some transmissions will occasionally overlap, corrupting the data from both transmitters; etc.

While these limitations could be overcome in a system having bi-directional operation, providing a receiver at the monitoring location would further reduce battery life. Expected battery life with present systems is measured in years. Providing continuous power to a radio receiver in the battery powered unit at the tank would simply not be practical. Maintenance of the monitoring system for battery changes or recharging would approach the manpower requirements of simply manually reading the gauge.

If electrical service and a phone line were provided at the tank, there would obviously be no concerns of battery usage, however this situation would substantially increase the cost and complexity of a tank installation. In addition, having electrical devices in close proximity to the tank would increase the risk of fire from leaks or from the venting of gas which occurs at the end of the filling process when the fittings are disconnected.

It should be noted that other remote storage or delivery systems suffer from similar problems. Remote pipeline flow meters, electric meters, and the like require monitoring. Even when electronically readable gauges are utilized, monitoring systems typically either require special reading equipment to be transported to the gauge, require a permanent wired connection to a monitoring system or, if monitored wirelessly, report only at relatively fixed intervals.

Existing underground gasoline storage tanks provide an example off the problems associated with monitoring. Traditionally, a long graduated stick has been inserted into the tank to determine the amount of gasoline remaining in the tank. Over the past few years, concerns have grown over the deterioration of aging underground tanks and the impact of leaks on the environment. Government regulation has led to stringent monitoring requirements which are virtually impossible to perform manually.

Automated systems for monitoring underground tanks are not easily implemented in existing installations. To install the wiring for such a monitoring system, extensive excavation is required, often through the cement deck around the storage tanks. Equipment and wiring in or around the tanks must also be designed to prevent explosion or fire in the event of escaping fuel or vapor. Wireless monitoring has heretofore been impractical simply because it is difficult to transmit an RF signal from an underground location.

Market pressures continue to push for intrinsically safe electronic devices with improved response times and reliability for remote asset monitoring and control, such as monitoring and reporting storage tank leakage. As such, challenges remain and a need persists for improvements in systems and methods for remote asset monitoring and control, to which the present invention is directed.

SUMMARY OF THE INVENTION

The present invention provides a system for monitoring and reporting of conditions at a storage, or delivery, system which overcomes the problems and alleviates the needs described above. The system comprises a sensor for sensing telemetric data such as a level of material within a storage vessel or rate of delivery; a data link in communication with the sensor, the data link having a radio transceiver configured for bi-directional wireless digital communication; a repeater repeating transmissions of the data link, wherein the repeater includes a solar panel as an energy source replenishment device; and a data gate having a radio transceiver configured for communication with one or more data links and a communication interface for further communication with a computer system.

In a preferred embodiment the data link and data gate employ a number of power-reducing techniques to make the devices well suited for battery operation. Such power reducing techniques include: intermittent operation of the voltage regulator; scheduled and synchronized operation of the transmitter and the corresponding receiver to allow power-down of both the transmitter and receiver; and use of a noise-tolerant protocol which allows transmitters to operate with the lowest possible power output.

In another preferred embodiment the communication interface may alternatively provide a connection through: 1) a conventional land line; 2) a cellular/pcs phone system; or 3) a satellite communication system. For purposes of the present invention, such systems are collectively referred to as the "public network."

In yet another preferred embodiment, the data gate communicates via a public network to a computer system configured as a database server. The database server makes the data collected from one or more data gates available to application programs over a computer network such as a local area network, the internet, etc. Software applications may provide, by way of example and not limitation: automatic order entry; dispatching; alarms; requests for routine maintenance; planning information; historical data; usage by a selected category, such as geographic region, customer demographics, historical usage, etc; logistical controls; etc.

In yet another preferred embodiment, controllable devices are provided at the remote monitoring site so that management of the storage or delivery system may be provided from the computing system, through the data gate and data link to controllable devices at the monitoring site. Monitoring criteria may thus be changed remotely or hardware devices may be controlled remotely.

Further objects, features, and advantages of the present invention will be apparent to those skilled in the art upon examining the accompanying drawings and upon reading the following description of the preferred embodiments.

DESCRIPTION OF THE PREFERRED EMBODIMENTS

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
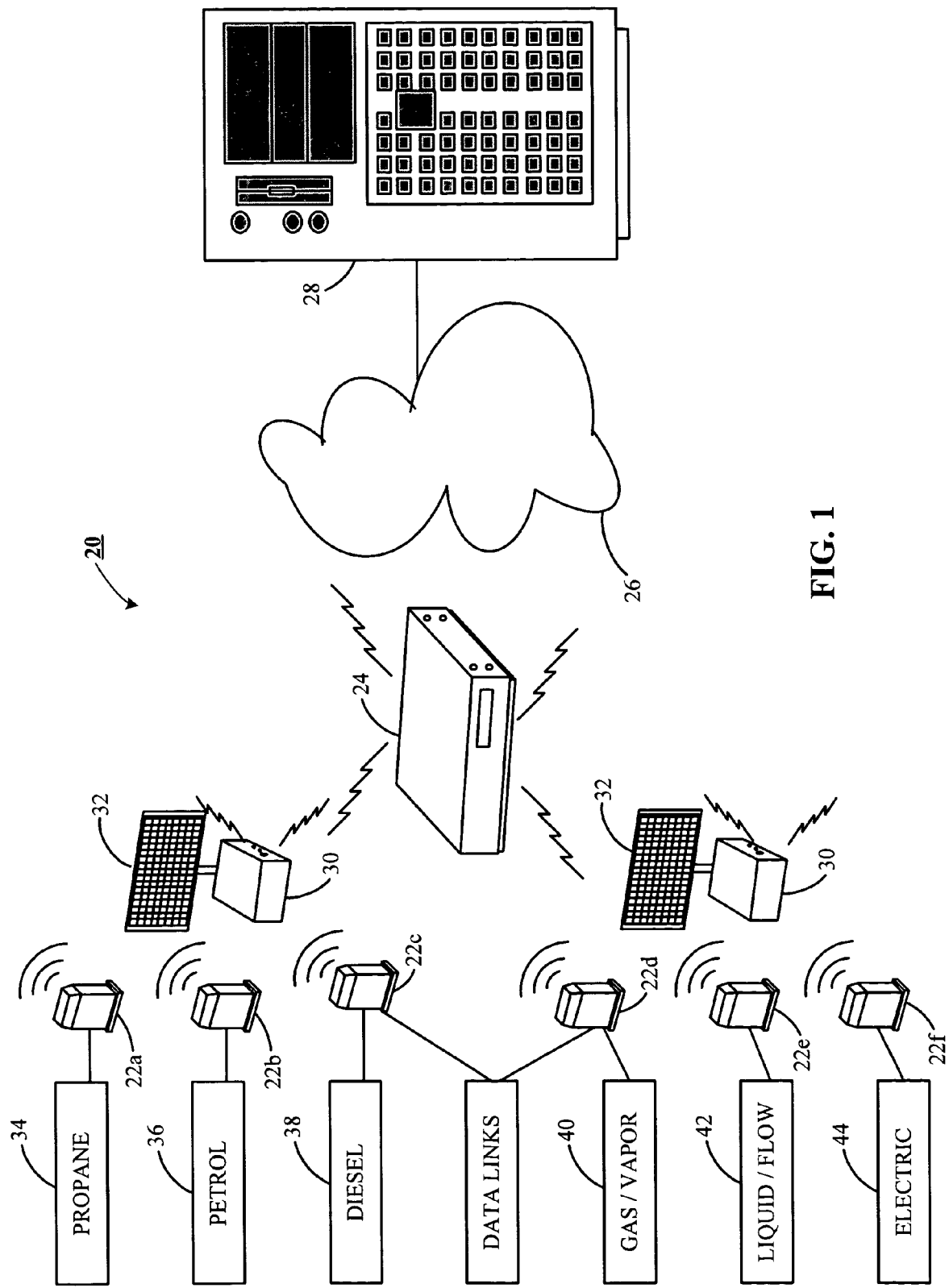
FIG. 1 depicts a preferred embodiment of the inventive system for monitoring and management.

Referring now to the drawings, wherein like reference numerals indicate the same parts throughout the several views, a block diagram of the inventive monitoring and management system ("system") 20 is shown in FIG. 1. System 20 is particularly useful for monitoring for leakage of a storage tank. In a typical system, one or more data links 22a-f (also referred to herein as an asset interface device), communicate with a data gate 24 (also referred to herein as a transmission device). The data gate 24, in turn, communicates via a public network 26, which in turn communicates with a server 28. In a preferred embodiment, the system 20 includes a repeater 30 that incorporates use of a solar panel 32 as a means for recharging a battery contained within the repeater. As will be described in more detail hereinbelow, communication along the data path of the system 20 is bi-directional.

In general terms, a data link, such as 22a-f, is a wireless transceiver configured for bidirectional digital communication with the data gate 24. The data link 22 is an intrinsically safe, battery operated, and housed in an enclosure suitable for outdoor use. It should be noted however, that the intrinsically safe status of data link 22 does not depend on its housing for its intrinsically safe classification, but rather from the configuration of the ultra low current consuming circuits of the data link 22. Preferably, data link 22 also includes circuitry for reading an electronically readable gauge, or other sensor, thus making data link 22 useful for remote reading of instrumentation as found on, by way of example and not limitation: a propane storage tank 34; a gasoline storage tank 36; a diesel fuel storage tank 38; a compressed gas tank 40; a water or gas meter 42; an electric meter 44; or the like.

As will be apparent to those skilled in the art, traditionally such devices have been equipped with gauges for visual monitoring of the device. Known methods may be used to convert mechanical gauges to an electronically readable configuration or existing electronically readable sensors can easily be added in addition to mechanical gauges. Further, such devices are often located outdoors or in remote areas making manual monitoring an inconvenient task and electrical service and wires for communication are rarely in place for automated monitoring. Thus, a weatherproof, wireless, battery operated device is by far the most preferable method for monitoring such devices.

Figure 2:
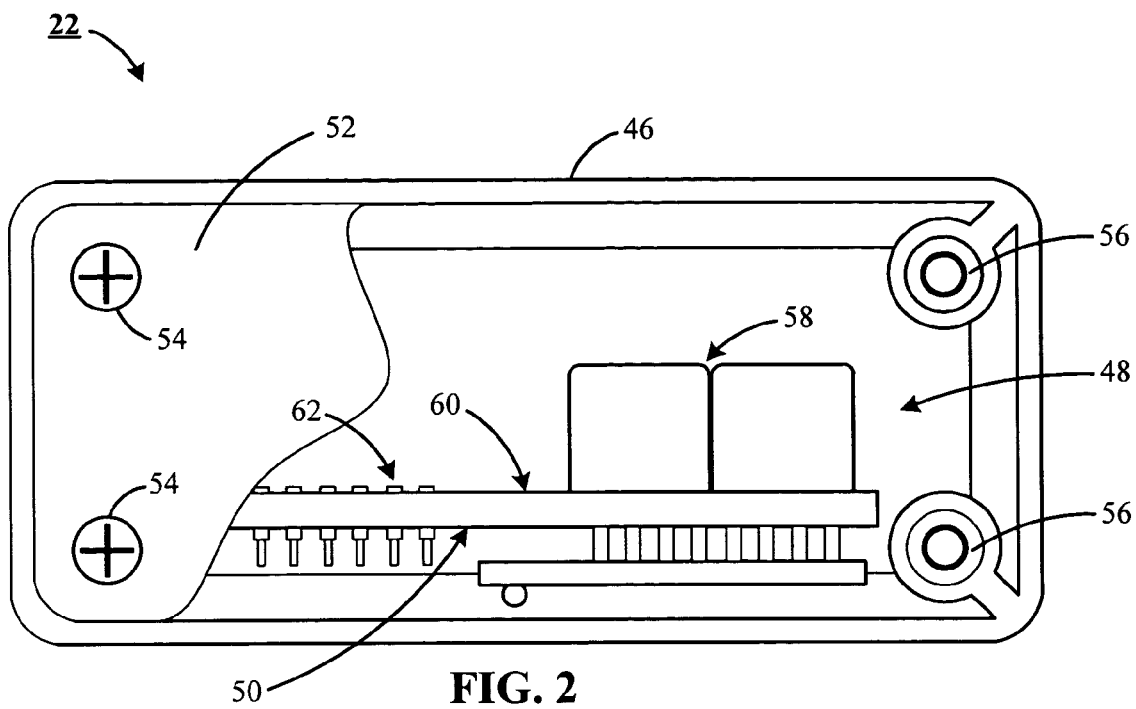
FIG. 2 provides a bottom view of a data link of the system of FIG. 1.
Figure 3:
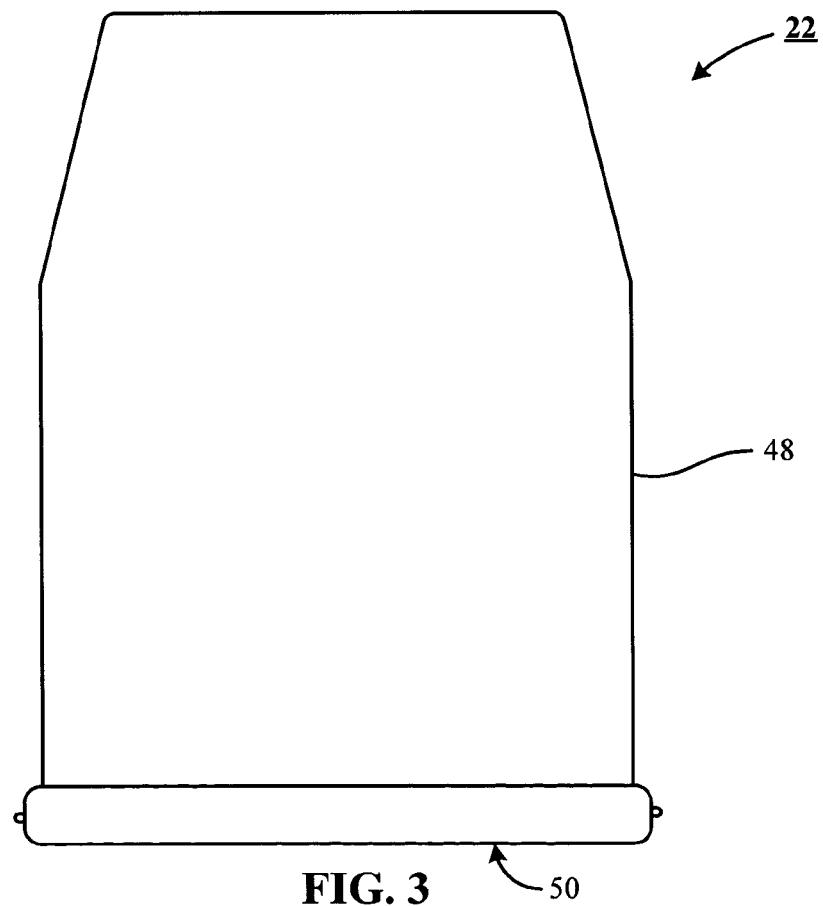
FIG. 3 provides an end view of the data link of FIG. 2.

Referring next to FIGS. 2 and 3, preferably data link 22 includes: an enclosure 46 having an open end 48; a circuit board 50 received through open end 48 and housed in enclosure 46; and a cover 52, which is secured to the enclosure 46 by fasteners 54, covers open end 48 to seal data link 22 from the environment. The fasteners 54 engage fastener retention bosses 56 during the assembly process to secure the cover 52 to the enclosure 46. However, it is noted that the intrinsically safe classification of data link 22 results from the configuration of the circuits of data link 22, rather than from the enclosure 46 and the cover 52 secured to the enclosure 46.

Circuit board 50 includes a wireless transceiver 58, sensor interface circuitry 60 for receiving a signal from an electronically readable instrument or sensor, or send a control signal to a controllable device interacting with the asset; and computing circuitry 62 such as a microcontroller, microprocessor, or other programmable device for controlling the operation of data link 22. Most preferably each data link 22 will be assigned a unique identifier to allow the data gate 24 (FIG. 1) to communicate individually with any particular data link 22. As shown in FIG. 1, multiple data links 22 can communicate through a single data gate 24. It should be noted that, while a system such as that depicted in FIG. 1 is possible, in a more typical installation, a data gate 24 would most likely receive signals from multiple data links interfaced to a common type of sensor. For example, several data links may be used to monitor LP storage tanks in a residential neighborhood with all of the data links reporting by way of a repeater or number of repeaters with attached solar panels, such as repeater 30 and solar panel 32 of FIG. 1, to a single data gate, or to multiple data gates, such as data gate 24 of FIG. 1, may be used to monitor a plurality of underground storage tanks at a service station, in which each tank has its own dedicated data link 22.

Figure 4:
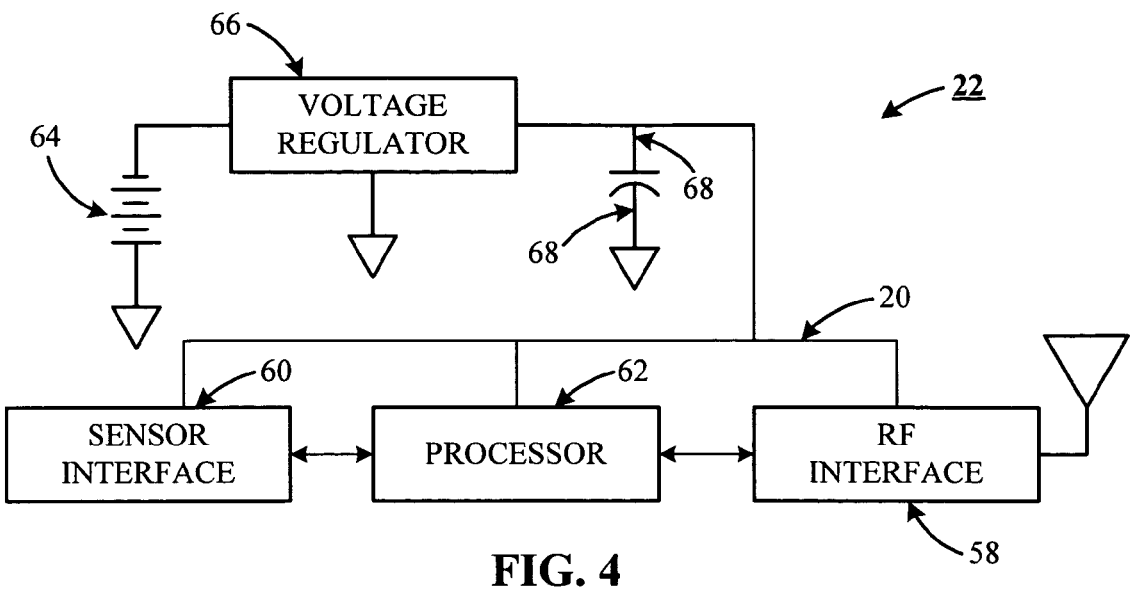
FIG. 4 provides a block diagram of the data link of FIG. 3.

Turning to FIG. 4, preferably the data link 22 includes circuit board 20 which comprises: wireless transceiver 58, shown in the form of an RF interface circuit, configured for wireless communication with repeaters 30, and/or data gates 24, (both of FIG. 1); computing circuitry 62 including a clock circuit, shown in the form of a processor, for controlling data link 22; a long life battery 64, for providing power requirements of the data link 22; a voltage regulator circuit 66, responsive to the clock circuit, intermittently activated by the clock circuit to conduct power for the battery 64 to the circuits of the data link 22 for a predetermined period of operation; and a capacitor 68 of predetermined capacitance, wherein upon activation of the voltage regulation circuit 66, the long life battery 64 provides energy to the capacitor during said predetermined period of operation to charge said capacitor. Upon deactivation of the voltage regulation circuit 66 by the clock circuit, the long life battery 64 continues to provide energy to the clock circuit until reactivation of the voltage regulation circuit 66 by said clock circuit.

Figure 5:
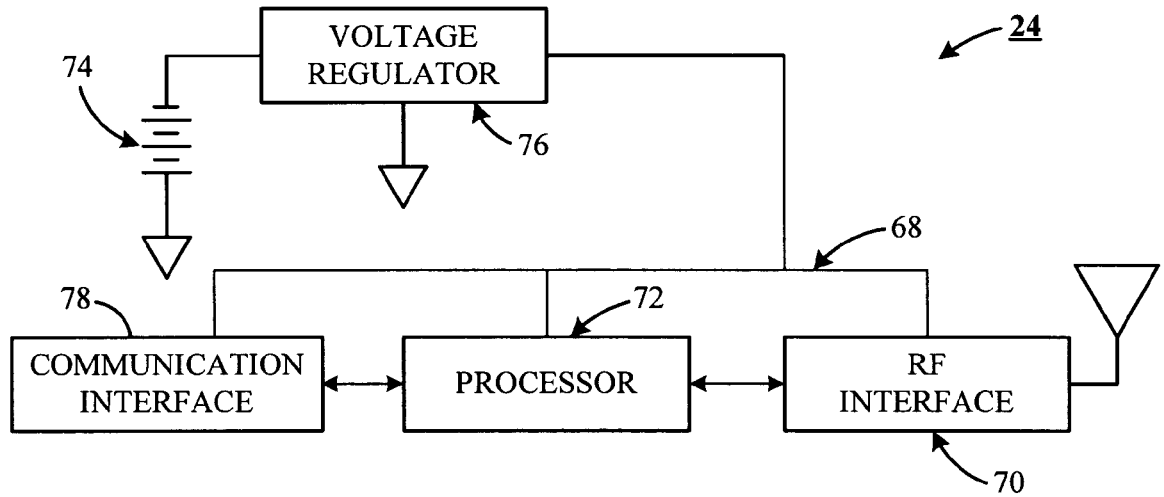
FIG. 5 provides a block diagram of a data gate for communicating with one or more data links of FIG. 3.

Referring next to FIG. 5, preferably data gate 24 includes circuit board 68 which comprises: wireless transceiver 70, shown in the form of an RF interface circuit, configured for wireless communication with data links 22a-f and, optionally, with public net work 26 (both of FIG. 1); computing circuitry 72 shown in the form of a processor, for controlling data gate 24; a long life battery 74, for providing power requirements of the data gate 24; a voltage regulator circuit 76 for controlling power to the circuits of the data gate 24; and in a preferred embodiment a communication interface circuit 78, communicating to a public network 26. In one preferred embodiment, the public network is the conventional telephone network, however it should be noted that other well known public networks include: cellular phone networks; CDMA phone networks; CDPD, GSM, and GPRS networks (which are a subset of a cellular phone network); satellite communication networks; the internet; and the like. Preferably, computing circuitry 66 (of FIG. 4) includes memory for storing configuration information, alarm thresholds, information received from data links 22 (of FIG. 1), etc.

As seen in FIG. 1, the server 32 communicates with the data gate 24 via a public network, such as over the conventional land-line telephone network. The server 32 comprises a server, i.e. a HTTP sever, used to manage network connections and the flow of information between the server and a client. With regard to the present invention, the purpose of the server is to send information to, and receive information from, the data gate 24 and to make such data available to others.

In the preferred embodiment, communication between the data gate 24 and server 32 take place in UDP format. UDP format allows the data gate and server to exchange packets of reasonable size without unduly burdening the data gate. Competing packet formats would increase the complexity and software footprint of the data gate. By design, server 32 expects data in HTTP format. To accommodate the needs of the server and those of the data gate 24, a UDP gateway application runs on the server which translates between HTTP for server 32 and UDP for the data gate 24 during communication between the two devices.

Each request made by the data gate 24 to the server 32 is limited to 500 bytes, or less, which thus fits into a single UDP packet. To achieve dense transfers, the data in the UDP packet is transmitted in its raw, binary format. At the server, the UDP gateway expands the binary data from the UDP packet into an ASCII string and adds the address of the HTTP server to create a single HTTP request line. The response from the HTTP server is then received by the UDP gateway and buffered in memory. The server breaks the response into 500 byte segments which can be transmitted easily via UDP and sends the first packet to the data gate 24. When the data gate 24 receives the first packet, it sends a request to the UDP gateway for the next packet. This process continues until all of the packets have been sent from the server 32 to the data gate 24. If the data gate requests a packet but does not receive the packet, after a period of time, it simply repeats the request.

It should be noted that, in a preferred embodiment, the server 32 is a web server and information to and from the data gate 24 may be sent and received in near real time from an internet connection anywhere in the world.

Referring back to FIG. 4, the sensor interface circuit 60 of the data link 22 can also be used with sensors designed for direct electronic reading such as discreet sensors, pressure transducers, level sensors, load cells, flow meters, accelerometers, etc. In a preferred embodiment, the interconnection between the sensor interface circuit 60 includes a loop-back connection, thus making it possible for the processor 62 to determine if and when a sensor is connected. When a sensor is not connected, as in shipping or storage, the data link 22 remains deactivated and does not attempt transfers over the wireless network. Once a sensor is detected, the data link 22 will attempt to connect to a network.

As mentioned above, the data link 22 is capable of reading data from a wide variety of sensors. In a preferred embodiment, after a sensor is connected and the data link 22 opens communication with the data gate 24, the data link 22 sends a request to the data gate 24 to find out what type of sensor is connected. The data gate 24 forwards the request to the server 32. From a database, the server 32 looks up the type of sensor to be connected to the data link 22 and reports the sensor type to the data gate 24. The data gate 24, in turn, reports the sensor type to the data link 22, and the data link 22 configures itself for the connected sensor.

Figure 6:
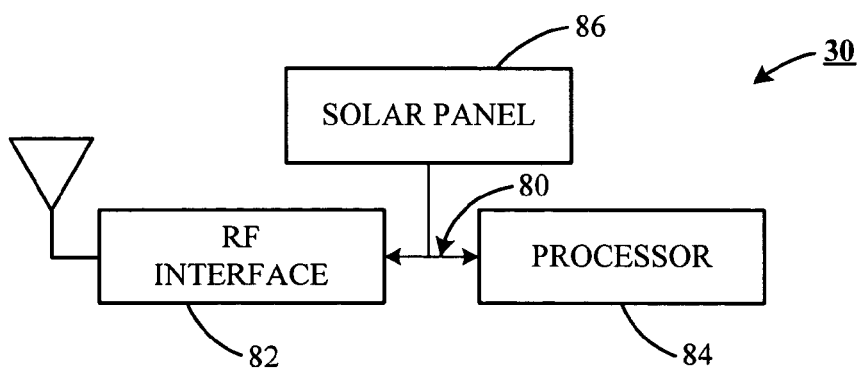
FIG. 6 provides a block diagram of a repeater for use in the inventive system of FIG. 1.

Referring to FIG. 1, if the distance between any data link 22a-f and data gate 24 is too great for reliable reception of the RF signal, a number of repeaters 30, configured with solar panels 32 can be inserted between the data links 22a-f and data gate 24. A block diagram of repeater 30 is shown in FIG. 6. Preferably, the repeater 30 comprises: a printed circuit board 80, supporting a wireless transceiver 82, shown in the form of an RF interface circuit, configured for wireless communication with data links 22a-f, and/or data gates 24; computing circuitry 84 including a clock circuit, shown in the form of a processor, for controlling repeater 30; and a solar panel 86 for recharging a long life battery contained within the repeater 30. In the transmission of data packets, as discussed in more detail hereinbelow, after each packet is transmitted, a blank packet, with the transmitter disabled, is left in the transmission. If a repeater is present, it receives an incoming packet and retransmits any received packets during the off time of the transmitting device.

It should be noted that both the data link 22 and the data gate 24 are preferably battery operated. Operation of the data link 22 and the data gate 24 is controlled in such a manner as to provide maximum conservation of battery power. In a preferred embodiment, transmissions between each data link 22 and its associated data gate 24 occur in a scheduled, synchronized manner. To conserve battery power, the entire radio frequency interface of both the data link and the data gate can be powered down until the next scheduled event.

In another preferred embodiment, battery power is conserved through intermittent operation of the voltage regulator. Referring again to FIG. 4, power is provided to circuitry of the data link 22 by the battery 64 through the voltage regulator 66. If, for the sake of example, it is assumed that the voltage regulator 66 has a quiescent current of 50 microamps, and the voltage regulator 66 is operated continuously in a normal manner, battery 64 will be subject to at least a 50 microamp drain at all times. If, on the other hand, the voltage regulator 66 is operated intermittently, perhaps with a two percent duty cycle, capacitor 68 is charged during the on-time of the voltage regulator 66 and operates the circuitry of the data link while the voltage regulator 66 is off. While some sag will occur in the voltage across capacitor 68 during the off-time of the voltage regulator 66, by selecting an appropriate value for capacitor 68, the sag in the voltage can be set to a negligible level. The selection of such a capacitor can easily by performed by one of ordinary skill in the art in light of the power requirements of the circuitry where:

$$\text{energy} = 0.5\ CV^2$$

the energy is the electrical energy required to power the circuitry during the off-time, C is the capacitance of capacitor 68 and V is the tolerable sag voltage. Alternatively, the value of capacitor C can be selected through empirical means.

Assuming the example above, while the power consumption of operational circuitry of the data link will remain the same, the quiescent current of the voltage regulator 66 has been reduced from 50 microamps to one microamp.

Another unique feature of the inventive system provides improved noise immunity, eliminates problems associated with jitter, or asymmetry, in the received data stream, and allows transmission at lower RF power than previous systems. In transmitting data via a radio frequency interface, there is often jitter in the rising and falling edges of the data. In a related problem, there is often a distinct difference in the rise time and the fall time. The result of these two problems is that there is some degree of uncertainty as to the exact positioning of actual data bits in a data stream and the rate at which the data bits are transmitted. In addition, there is the potential for mid-bit noise which can cause a single bit to read at the value opposite the transmitted binary value.

To properly resolve the incoming data, the received data is sampled at sixteen times its transmitted rate. Each radio transmission begins with a block of alternating ones and zeroes. The processor uses this block to determine a reference point for the start of each bit. As the data is received, the processor ignores the first three samples of each bit and the last three samples to avoid mistakes caused by jitter or asymmetry. The remaining ten samples are used to determine the state of the bit on a majority-wins basis. Due to the noise immunity and the tolerance to asymmetry of this reception scheme, the radios can transmit at minimum power while maintaining the integrity of the data carried by the signal.

Figure 7:
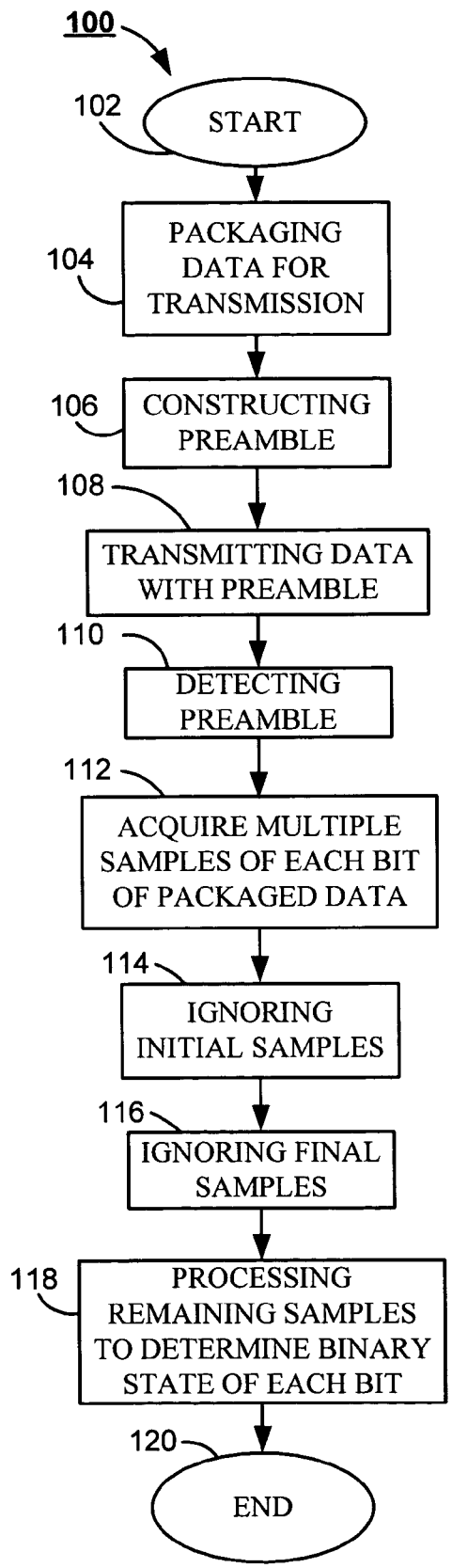
FIG. 7 provides a flow chart of a method for communicating between a data link and a data gate over a network for use in the inventive system of FIG. 1.

FIG. 7 shows schema 100 of a method of the aforementioned data integrity scheme commencing at start step 102 and continuing at process step 104 with packaging of data to be transmitted over a network (such as 20) into a packet at a transmitting device (such as data link 22), wherein the packet is made up of a plurality of sequential bits representing data collected by a sensor circuit (such as 60). At process step 106 a preamble is constructed and attached to the plurality of sequential bits at a transmission device. The preamble is constructed in accordance with a predetermined bit pattern. With the preamble attached to the plurality of sequential bits, at process step 108, the plurality of sequential bits and attached preamble are transferred over the network, at a predetermined bit transfer rate by said transmitting device.

At process step 110, the predetermined bit pattern of the preamble is detected by a receiving device (such as data gate 24) to determine a starting position for the plurality of sequential bits. That is, the starting position of the plurality of sequential bits is based on said predetermined bit pattern. At process step 112, each of the plurality of sequential bits is sampled at the receiving device. The receiving device samples each bit of the plurality of sequential bits at a predetermined bit sample rate, which is at a rate greater than the predetermined bit transfer rate. Having the sample rate greater than the predetermined bit transfer rate assures that a plurality of samples of each of the plurality of sequential bits are taken during a sample period for each of the plurality of sequential bits of the packet. At process step 114, a predetermined number of the beginning samples of a sampled bit are discarded; at step 116, a predetermined number of the of the ending samples of a sampled bit are discarded; and at process step 118, the remaining samples of the sampled bit are processed by the data gate to determine a binary state of the bit. The method of the aforementioned data integrity scheme 100 concludes at end process step 120.

In an alternate preferred embodiment, each end of the link uses two 128-bit encryption keys to encrypt the payload data. The transmission scheme also provides forward error correction that converts each byte into a 12 bit value, allowing the receiver to detect and correct large numbers of bit errors. This technique also allows the radio to reach further with lower output power. Such encryption and forward error correction schemes are well known in the art.

In an alternative preferred embodiment, all data transmissions are duplicated on a second RF frequency. In the event other radio traffic is taking place on one channel, essentially jamming traffic on that channel, the data may still be properly received on the second channel.

Figure 8:
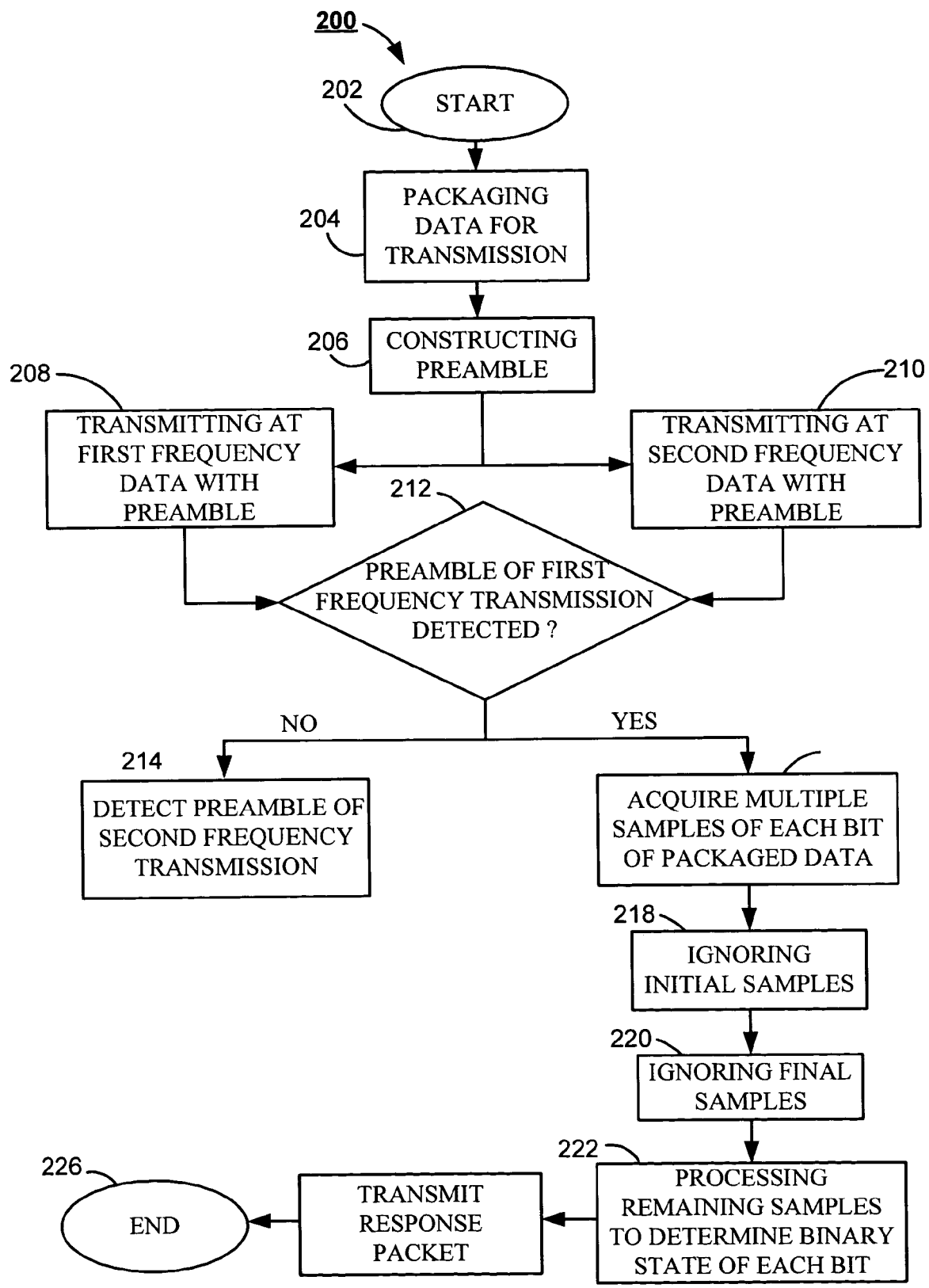
FIG. 8 provides a flow chart of a method for communicating over a wireless network between a data link, a data gate, and a server configured to accept HTTP input for use in the inventive system of FIG. 1.

FIG. 8 shows schema 200 of a method of the aforementioned data integrity scheme commencing at start step 202 and continuing at process step 204 with packaging of data to be transmitted over a network (such as 20) into a packet at a transmitting device (such as data link 22), wherein the packet is made up of a plurality of sequential bits representing data collected by a sensor circuit (such as 60). At process step 206 a preamble is constructed and attached to the plurality of sequential bits at a transmission device. The preamble is constructed in accordance with a predetermined bit pattern. With the preamble attached to the plurality of sequential bits, at process step 208, the plurality of sequential bits and attached preamble are transmitted over the network via RF transmission on a first frequency channel. The plurality of sequential bits and attached preamble are transferred by the transmitting device at a predetermined bit transfer rate. With the preamble attached to the plurality of sequential bits, at process step 210, the plurality of sequential bits and attached preamble are re-transmitted over the network via RF transmission on a second frequency channel, at the same predetermined bit transfer rate.

At process step 212, the predetermined bit pattern of the preamble of the transmission of the first frequency channel is detected by a receiving device (such as data gate 24) to determine a starting position for the plurality of sequential bits. If the detection of the preamble fails at process step 212, the method progress to process step 214. At process step 214, the predetermined bit pattern of the preamble of the transmission of the first frequency channel is detected by a receiving device (such as data gate 24) to determine a starting position for the plurality of sequential bits. That is, the starting position of the plurality of sequential bits is based on said predetermined bit pattern. If the detection of the preamble is successful at process step 212, or at process step 214, the method progress to process step 216.

At process step 216, each of the plurality of sequential bits is sampled at the receiving device. The receiving device samples each bit of the plurality of sequential bits at a predetermined bit sample rate, which is at a rate greater than the predetermined bit transfer rate. Having the sample rate greater than the predetermined bit transfer rate assures that a plurality of samples of each of the plurality of sequential bits are taken during a sample period for each of the plurality of sequential bits of the packet. At process step 218, a predetermined number of the beginning samples of a sampled bit are discarded; at step 220, a predetermined number of the of the ending samples of a sampled bit are discarded; at process step 222, the remaining samples of the sampled bit are processed by the data gate to determine a binary state of the bit; and at process step 224, a response packet is transmitted by the receiving device to the transmitting device. The method of the aforementioned data integrity scheme 200 concludes at end process step 226.

In yet another preferred embodiment, the payload data is constrained to no more than 16 bytes per transmission. A 16-bit checksum is calculated for the entire packet before forward error correction is applied. The checksum is then recalculated at the receiving end after the error correction scheme is used to reconstruct the original packet. If the original checksum and recalculated checksum do not match, the packet is ignored. Increasing the length of the data payload results in a proportional increase in the odds, an uncorrectable error will occur. If a longer transmission is necessary, the payload data is simply divided into 16 byte transmissions.

In still another preferred embodiment, each time a packet is received, the receiving device determines the received signal strength from its transmitting partner. The next packet sent to the partner includes an indication of the last received signal strength. In this manner, devices at both ends of the transmission can determine the quality of its received transmission. If the signal strength is lower than ideal, a device will adjust the output power slightly upwards for future transmissions, and if the received power is greater than necessary for good reception, the device will slightly lower its output power for future transmissions. This allows each device to minimize its output power and thus maximize its battery life.

By way of example and not limitation, an example of RF network timing, given in bit times, for a system incorporating each of the above-described preferred embodiments is as follows: during bit times 0-699, the data link transmits a packet on channel 1; during bit times 700-1399, the data link transmits the same packet on channel 2; during bit times 1400-2099, the repeater, if present retransmits the packet on channel 1; during bit times 2100-2799, the repeater, if present, retransmits the packet on channel 2; during bit times 2800-3499, the data gate processes the received packet; during bit times 3500-4199, the data gate transmits the response packet on channel 1; during bit times 4200-4899, the data gate transmits the same response packet on channel 2; during bit times 4900-5599, the repeater, if present, retransmits the response packet on channel 1; and during bit times 5600-6299, the repeater, if present, retransmits the response packet on channel 2. It should be noted that in the preferred embodiment, the timing does not change for payload data shorter than 16 bytes in length. When a shorter packet is sent, the transmitter, and receivers, simply turns off sooner for each phase of the data transfer sequence to conserve power, and for the time of the next event in the sequence to re-power the radio interface.

In practice, at time zero, the data link transmits a packet on channel 1 and deactivates all but the clock circuit for the remaining bit times. At approximately bit time 660, the data link reactivates and configures the radio for transmission on channel 2. At bit time 700, the data link sends the same packet via channel 2. The data link again deactivates all but the clock circuit until approximately bit time 3460 when it reactivates in anticipation of a response from the data gate on channel 1. If, by bit time 3520, the packet start is not detected, the data link assumes the data is corrupt and deactivates all but the clock circuit. At time 4160, the data link reactivates in anticipation of a response from the data gate on channel 2. Again, if the start of the packet is not detected by bit time 4220, the data link deactivates all but the clock circuit and reactivates at 4860 in anticipation of a response from a repeater on channel 1. If that attempt fails, the data link deactivates all but the clock circuit and reactivates at 5560 in anticipation of a response from the repeater on channel 2. When, during this process, a valid response packet is received, the data link processes the data and deactivates all but the clock circuit until its next scheduled transmission.

When a data gate, such as 24 of FIG. 1, is first put into service, it initially enters a "learn" mode. During the learn mode, in the absence of incoming packets, the data gate remains idle. In response to receipt of a packet, the data gate schedules the next transmission from a data link, such as 22 of FIG. 1. In the learn mode, the data gate builds a schedule for all of the available data links such that no two devices will have overlapping transmission. Further, the data gate stores information on precisely when transmissions from data links will occur, and thus, the times at which it the data gate needs to be activated.

As will be apparent to those skilled in the art, the cited example of operating modes given herein are merely exemplary of the many modes of operation of which the inventive data management system is capable, particularly in light of the flexibility provided by the bi-directional nature of the inventive system 20. By way of example and not limitation, the inherent reliability of the data transmission incorporated in the inventive system makes the system well suited for reprogramming a data link, such as 22 of FIG. 1. Such programming can include alarm thresholds, identifying sensor types, loading a program to direct operation of the data link, or even downloading updated software for the processor in the data link.

It should be noted that while FIG. 1 is drawn to a system having a single data gate 24. However, in a typical configuration, it is actually envisioned that a typical server 32 will communicate with multiple data gates 24, with each data gate communicating with one or more data links 22. Thus, the inventive system is capable of the simultaneous monitoring and management of virtually any number of storage or delivery systems. It should also be noted that in a typical system, the server 32 provides information to application programs which can automate processes which have heretofor required some manual data entry, for example, but not by way of imposing limitation on the present invention: scheduling delivery of propane to residential storage tanks; periodic billing for delivered natural gas, water, or electrical power; managing of stored materials in a tank farm; etc. In addition, the data gathered by the system may be analyzed to recognize the likelihood of leaks, theft, etc., and to produce an alarm when such an event is detected.

In one preferred embodiment, the inventive monitoring system 20 is used to detect leaks in underground storage tanks. Regardless of the technique used to determine if a leak occurs, the status of the tank must be reported to a monitoring system. Many underground tanks were installed before monitoring requirements were in place. Presently, wiring is added by excavating a trench between a nearby building and the storage tanks. This is a costly and time consuming process. With the inventive system, a monitoring system with a wireless interface can simply be lowered into the tank through the access port for filling.

As will be apparent to those skilled in the art, radio frequency signals originating sub-grade will be severely attenuated as they pass from a data link 22 in route to a data gate 24. However, the inventive system 20 will automatically adapt to this environment. First, the system 20 is capable of retrieving data from very weak received signals through the over-sampling scheme discussed above. Second, the system will automatically adjust the power levels based on the received signal strength at each unit as discussed above. Third, a number of repeaters may be added to repeat signals transmitted between data links 22 and data gates 24 to assure integrity of the transmission.

As will be apparent to those skilled in the art, a number of modifications could be made to the preferred embodiments which would not depart from the spirit or the scope of the present invention. By way of example and not limitation, the public network could further include fiber optic transmission of data, over-land microwave links, infrared data links, etc. While the presently preferred embodiments have been described for purposes of this disclosure, numerous changes and modifications will be apparent to those skilled in the art. Such changes and modifications are encompassed within the spirit of this invention.

What is claimed is:

1. An asset interface device comprising:
    a clock circuit intermittently activating a circuit of said device for a predetermined period of operation;
    a sensor circuit communicating with said clock circuit, wherein said sensor circuit is responsive to operational data related to an asset communicating with said asset interface device;
    a transceiver circuit communicating with said sensor circuit, wherein said transceiver circuit transmits and receives said operational data during said predetermined period of operation; and
    a control circuit communicating with and interposed between said sensor circuit and said transceiver circuit translating said operational data during said predetermined period of operation, wherein said clock circuit, sensor circuit, transceiver circuit, and control circuit each operate as ultra low current consuming circuits, which provide for an intrinsically safe classification of said asset interface device without having to rely on an enclosure enclosing said clock circuit, sensor circuit, transceiver circuit, and control circuit for said intrinsically safe classification.

2. The device of claim 1, further comprising a voltage regulation circuit configured as an ultra low current consuming circuit and responsive to said clock circuit, wherein upon activation of said voltage regulation circuit by said clock circuit for said predetermined period of operation, said voltage regulation circuit conducts energy to each said sensor, transceiver, and control circuit for operation of said sensor, transceiver, and control circuits.

3. The device of claim 2, further comprising an energy source communicating with said voltage regulation circuit, wherein said energy source provides energy conducted by said voltage regulation circuit to said sensor, transceiver, and control circuits during said predetermined period of operation.

4. The device of claim 3, in which said voltage regulation circuit comprises a capacitor of predetermined capacitance, wherein upon activation of said voltage regulation circuit, said energy source provides energy to said capacitor during said predetermined period of operation to charge said capacitor.

5. The device of claim 4, in which said capacitor communicates with said clock circuit and provides energy to said clock circuit upon deactivation of said voltage regulation circuit by said clock circuit, and continues to provide energy to said clock circuit until reactivation of said voltage regulation circuit by said clock circuit.

6. The device of claim 5, in which said predetermined capacitance of said capacitor is selected to minimize sag in the voltage across said capacitor during deactivation of said voltage regulation circuit.

7. The device of claim 4, further comprises a transmission power adjustment circuit communicating with said control circuit, wherein said transmission power adjustment circuit increases an output power of said transceiver circuit when a signal strength is lower than ideal, and decreases said output power of said transceiver circuit when said signal strength is greater than necessary for good reception.

8. A system for intrinsically safe monitoring of a volatile materials storage and delivery system comprising:
    an asset interface device comprising:
        a clock circuit intermittently activating a low quiescent current voltage regulator circuit of said device for a predetermined period of operation;
        a capacitor connected to the output of the regulator, wherein said capacitor is charged until a voltage level of said capacitor attains an upper limit during said predetermined period of operation;
        a sensor circuit communicating with said clock circuit, wherein said sensor circuit is responsive to operational data related to said volatile materials storage and delivery system;
        a transceiver circuit communicating with said sensor circuit, wherein said transceiver circuit transmits and receives said operational data during said predetermined period of operation;
        a control circuit communicating with and interposed between said sensor circuit and said transceiver circuit translating said operational data during said predetermined period of operation, wherein said clock circuit, sensor circuit, transceiver circuit, and control circuit each operate as ultra low current consuming circuits, which provide for an intrinsically safe classification of said asset interface device without having to rely on an enclosure enclosing said clock circuit, sensor circuit, transceiver circuit, and control circuit for said intrinsically safe classification;

a data transmission repeater communicating with said asset interface device, wherein said data transmission repeater receives said operational data during said predetermined period of operation and retransmits said operational data during said predetermined period of operation;

a data gate communicating with said asset interface device and said data transmission repeater, said data gate detects said transmitted operational data during said predetermined period of operation and retransmits said operational data; and a server communicating with said data gate, wherein said server receives said operational data from said data gate and transmits operational data to said data gate for management of said volatile materials storage and delivery system, wherein said volatile materials storage and delivery system includes a controllable device communicating with said asset interface device to effect said management of said volatile materials storage and delivery system, and wherein transmission of said operational data is transmitted by steps for communicating over a wireless network between said asset interface device, said data gate, and said server, wherein said server is configured to accept HTTP protocol.

9. The system of claim 8, in which said steps for communicating over said wireless network between said asset interface device, said data gate, and said server configured to accept HTTP protocol comprise:
 (a) packaging said operational data to be transmitted over said network into a packet at said asset interface device, wherein said packet comprises a plurality of sequential bits;
 (b) constructing a preamble to said plurality of sequential bits at said asset interface device, wherein said preamble comprises a predetermined bit pattern;
 (c) transmitting said packet with said preamble over a first radio frequency channel from said asset interface device, wherein said preamble and said plurality of sequential bits are transmitted at a predetermined bit transfer rate by said asset interface device;
 (d) transmitting said packet with said preamble over a second radio frequency channel from said asset interface device, wherein said preamble and said plurality of sequential bits are transmitted at a predetermined bit transfer rate by said asset interface device;
 (e) detecting said predetermined bit pattern at said data gate of said preamble transmitted over said first radio frequency channel to determine a starting position for said plurality of sequential bits based on said predetermined bit pattern; else
 (f) detecting said predetermined bit pattern at said data gate of said preamble transmitted over said second radio frequency channel to determine said starting position for said plurality of sequential bits based on said predetermined bit pattern, when determination of said starting position for said plurality of sequential bits transmitted over said first radio frequency channel fails;
 (g) sampling said plurality of sequential bits at said data gate, wherein said data gate samples each bit of said plurality of sequential bits at a predetermined bit sample rate, wherein said predetermined bit sample rate is greater than said predetermined bit transfer rate such that a plurality of samples of each of the plurality of sequential bits are taken during a sample period for each bit of said plurality of sequential bits of said packet; and
 (h) transmitting a response packet from said data gate to said asset interface device over said first and second radio frequency channels.

10. The system of claim 9, in which said steps for communicating over said wireless network between said asset interface device, said data gate, and said server configured to accept HTTP protocol further comprise:
 (i) for each bit of said plurality of sequential bits received at said data gate,
  (1) ignoring a predetermined number of samples of each bit of said plurality of sequential bits taken during a beginning portion of said sample period;
  (2) saving a predetermined number of samples of each bit of said plurality of sequential bits taken during an intermediate portion of said sample period;
  (3) ignoring a predetermined number of samples of each bit of said plurality of sequential bits taken during an ending portion of said sample period; and
  (4) processing said predetermined number of saved samples of each bit of said plurality of sequential bits to determine a binary state of each bit of said plurality of sequential bits; and
 (j) reconstructing said packet from said binary state of each bit of said plurality of sequential bits determined in step (i)(4);
 (k) forming a UDP packet including a first header from said reconstructed packet;
 (l) transmitting said UDP packet from said data gate to said server; and
 (m) executing a program in said server which includes the steps of:
  (1) receiving said UDP packet;
  (2) expanding data of said UDP packet into an ASCII string;
  (3) adding predetermined information to said ASCII string to form a valid HTTP request line; and
  (4) submitting said HTTP request line to the server.

11. The system of claim 8, in which upon activation of said low quiescent current voltage regulator circuit by said clock circuit for said predetermined period of operation, said low quiescent current voltage regulator circuit conducts energy to each said sensor, transceiver, and control circuit for operation of said sensor, transceiver, and control circuits.

12. The system of claim 11, further comprising an energy source communicating with said low quiescent current voltage regulator circuit, wherein said energy source provides energy conducted by said low quiescent current voltage regulator circuit to said sensor, transceiver, and control circuits during said predetermined period of operation.

13. The system of claim 12, in which said capacitor communicates with said clock circuit and provides energy to said clock circuit upon deactivation of said low quiescent current voltage regulator circuit by said clock circuit, and continues to provide energy to said clock circuit until reactivation of said low quiescent current voltage regulator circuit by said clock circuit.

14. The system of claim 13, in which said capacitor is selected to minimize sag in the voltage across said capacitor during deactivation of said low quiescent current voltage regulator circuit.

15. The system of claim 8, further comprises a transmission power adjustment circuit communicating with said control circuit, wherein said transmission power adjustment circuit increases an output power of said transceiver circuit when a signal strength is lower than ideal, and decreases said output power of said transceiver circuit when said signal strength is greater than necessary for good reception.

16. The system of claim 8, in which the repeater comprises a solar panel.

17. A system for intrinsically safe monitoring of leakage of an underground storage tank comprising:
an asset interface device comprising:
a clock circuit intermittently activating a low quiescent current voltage regulator circuit of said device for a predetermined period of operation;
a capacitor connected to the output of the regulator, wherein said capacitor is charged until a voltage level of said capacitor attains an upper limit during said predetermined period of operation;
a sensor circuit communicating with said clock circuit, wherein said sensor circuit is responsive to operational data related to said volatile materials storage and delivery system;
a transceiver circuit communicating with said sensor circuit, wherein said transceiver circuit transmits and receives said operational data during said predetermined period of operation;
a control circuit communicating with and interposed between said sensor circuit and said transceiver circuit translating said operational data during said predetermined period of operation, wherein said clock circuit, sensor circuit, transceiver circuit, and control circuit each operate as ultra low current consuming circuits, which provide for an intrinsically safe classification of said asset interface device without having to rely on an enclosure enclosing said clock circuit, sensor circuit, transceiver circuit, and control circuit for said intrinsically safe classification;
a data transmission repeater communicating with said asset interface device, wherein said data transmission repeater receives said operational data during said predetermined period of operation and retransmits said operational data during said predetermined period of operation;
a data gate communicating with said asset interface device and said data transmission repeater, said data gate detects said transmitted operational data during said predetermined period of operation and retransmits said operational data; and
a server communicating with said data gate, wherein said server receives said operational data from said data gate and transmits operational data to said data gate for management of said volatile materials storage and delivery system, wherein said volatile materials storage and delivery system includes a controllable device communicating with said asset interface device to effect said management of said volatile materials storage and delivery system, and wherein transmission of said operational data is transmitted by steps for communicating over a wireless network between said asset interface device, said data gate, and said server, wherein said server is configured to accept HTTP protocol.

18. The system of claim 17, in which said steps for communicating over said wireless network between said asset interface device, said data gate, and said server configured to accept HTTP protocol comprise:
(a) packaging said operational data to be transmitted over said network into a packet at said asset interface device, wherein said packet comprises a plurality of sequential bits;
(b) constructing a preamble to said plurality of sequential bits at said asset interface device, wherein said preamble comprises a predetermined bit pattern;
(c) transmitting said packet with said preamble over a first radio frequency channel from said asset interface device, wherein said preamble and said plurality of sequential bits are transmitted at a predetermined bit transfer rate by said asset interface device;
(d) transmitting said packet with said preamble over a second radio frequency channel from said asset interface device, wherein said preamble and said plurality of sequential bits are transmitted at a predetermined bit transfer rate by said asset interface device;
(e) detecting said predetermined bit pattern at said data gate of said preamble transmitted over said first radio frequency channel to determine a starting position for said plurality of sequential bits based on said predetermined bit pattern; else
(f) detecting said predetermined bit pattern at said data gate of said preamble transmitted over said second radio frequency channel to determine said starting position for said plurality of sequential bits based on said predetermined bit pattern, when determination of said starting position for said plurality of sequential bits transmitted over said first radio frequency channel fails;
(g) sampling said plurality of sequential bits at said data gate, wherein said data gate samples each bit of said plurality of sequential bits at a predetermined bit sample rate, wherein said predetermined bit sample rate is greater than said predetermined bit transfer rate such that a plurality of samples of each of the plurality of sequential bits are taken during a sample period for each bit of said plurality of sequential bits of said packet; and
(h) transmitting a response packet from said data gate to said asset interface device over said first and second radio frequency channels.

19. The system of claim 18, in which said steps for communicating over said wireless network between said asset interface device, said data gate, and said server configured to accept HTTP protocol further comprise:
(i) for each bit of said plurality of sequential bits received at said data gate,
(1) ignoring a predetermined number of samples of each bit of said plurality of sequential bits taken during a beginning portion of said sample period;
(2) saving a predetermined number of samples of each bit of said plurality of sequential bits taken during an intermediate portion of said sample period;
(3) ignoring a predetermined number of samples of each bit of said plurality of sequential bits taken during an ending portion of said sample period; and
(4) processing said predetermined number of saved samples of each bit of said plurality of sequential bits to determine a binary state of each bit of said plurality of sequential bits; and
(j) reconstructing said packet from said binary state of each bit of said plurality of sequential bits determined in step (i)(4);
(k) forming a UDP packet including a first header from said reconstructed packet;
(l) transmitting said UDP packet from said data gate to said server; and
(m) executing a program in said server which includes the steps of:
(1) receiving said UDP packet;

(2) expanding data of said UDP packet into an ASCII string;

(3) adding predetermined information to said ASCII string to form a valid HTTP request line; and (4) submitting said HTTP request line to the server.

20. The system of claim 17, in which upon activation of said low quiescent current voltage regulator circuit by said clock circuit for said predetermined period of operation, said low quiescent current voltage regulator circuit conducts energy to each said sensor, transceiver, and control circuit for operation of said sensor, transceiver, and control circuits.

21. The system of claim 20, further comprising an energy source communicating with said low quiescent current voltage regulator circuit, wherein said energy source provides energy conducted by said low quiescent current voltage regulator circuit to said sensor, transceiver, and control circuits during said predetermined period of operation.

22. The system of claim 21, in which said capacitor communicates with said clock circuit and provides energy to said clock circuit upon deactivation of said low quiescent current voltage regulator circuit by said clock circuit, and continues to provide energy to said clock circuit until reactivation of said low quiescent current voltage regulator circuit by said clock circuit.

23. The system of claim 22, in which said capacitor is selected to minimize sag in the voltage across said capacitor during deactivation of said low quiescent current voltage regulator circuit.

24. The system of claim 17, further comprises a transmission power adjustment circuit communicating with said control circuit, wherein said transmission power adjustment circuit increases an output power of said transceiver circuit when a signal strength is lower than ideal, and decreases said output power of said transceiver circuit when said signal strength is greater than necessary for good reception.

25. The system of claim 17, in which the repeater comprises a solar panel.

* * * * *